April 12, 1927.
J. W. BEMENT
1,624,462
LUGGAGE CARRIER FOR AUTOMOBILES
Filed Nov. 3, 1924
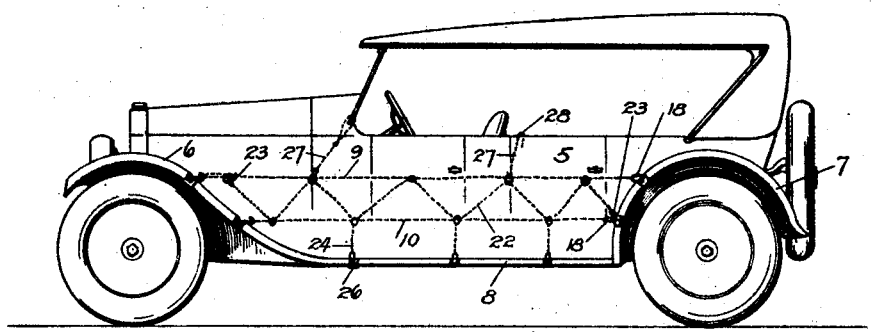
Fig. 1.
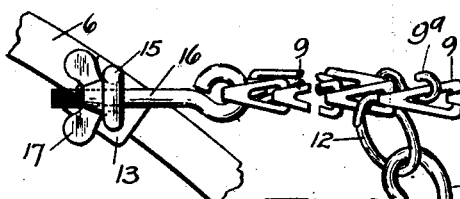
Fig. 3.
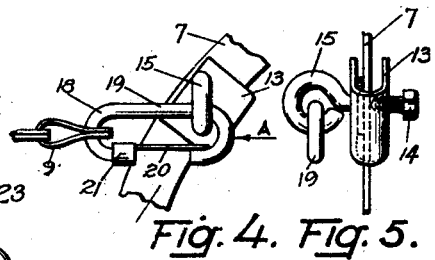
Fig. 4. Fig. 5.
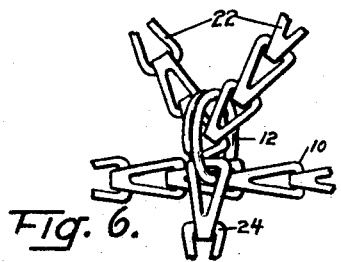
Fig. 6.
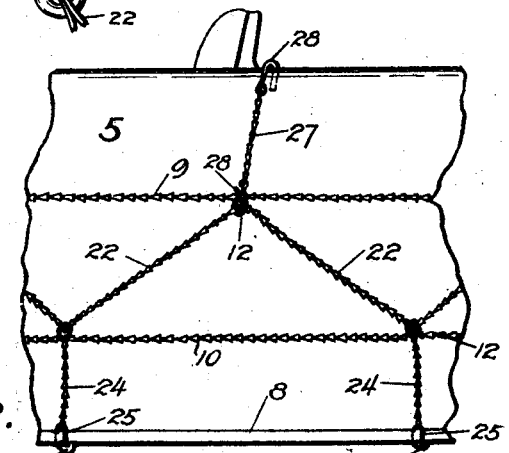
Fig. 2.
Fig. 7.
INVENTOR.
J. W. Bement.
BY
ATTORNEY.

Patented Apr. 12, 1927.

1,624,462

UNITED STATES PATENT OFFICE.

JOHN W. BEMENT, OF VENICE, CALIFORNIA.

LUGGAGE CARRIER FOR AUTOMOBILES.

Application filed November 3, 1924. Serial No. 747,623.

My invention relates to luggage carriers for automobiles and more particularly to certain new and useful improvements in luggage carriers of the type shown and described in my U. S. Letters Patent #1,381,-961, dated June 21, 1921.

The device disclosed in the patent comprises in brief, a net of chains which in association with a running board of an automobile, forms a convenient carrier space for suitcases and other luggage. Practical and easily adjusted means are provided to fasten the net in a tightly stretched condition along or around bags and other things disposed thereon, and the parts of the net are relatively arranged so as to be easily detached and readily collapsed for storage in a tool chest or the like.

The luggage carrier consists with these objects in view of two longitudinal chain-members which are fastened at their ends to the mudguards of the vehicle, cross members connecting the longitudinal members, and fastening members by which the longitudinal chains are secured at the edge of the running board and to the body of the car at points between their extremities.

The cross members are detachable from the longitudinal members so that either of the latter may be used independently to hold articles of smaller or larger dimensions.

The improvements constituting the subject of the present invention reside more particularly in the construction of the cross members and the means for connecting them to the longitudinal chains, whereby the cross members are provided of a single chain attached at intervals and in a zig-zag manner to the other chains by fastenings which permit of their ready detachment and adjustment.

Other objects relating principally to the construction of the fastenings will be brought out in the course of the following description with reference to the accompanying drawings which illustrate a preferred embodiment of the invention.

In the drawings in the several views of which like parts are similarly designated, Figure 1 represents a side-elevation of an automobile, showing the improved luggage carrier in operative relation to a running board thereof;

Figure 2, an enlarged view of a portion of the vehicle and the luggage carrier, showing more clearly the manner in which the longitudinal members and the cross members are connected to each other and to the running board and the body of the vehicle;

Figure 3, an enlarged view of a means for fastening the carrier to the front mud-guard of the vehicle;

Figure 4, an enlarged view of the fastening which connects the longitudinal chains at the rear mudguard of the vehicle;

Figure 5, an edge-view of the parts shown in Figure 4, looking in the direction of the arrow A;

Figure 6, a fragmentary view illustrating on a larger scale the method of connecting the longitudinal and cross members of the carrier; and Figure 7, an enlarged perspective view of one of the lugs employed to fasten the carrier to the running board.

Referring more specifically to the drawings, the numeral 5 designates the body of an automobile of the conventional touring type, 6 and 7 the front and rear mudguards at opposite ends thereof, and 8 one of the running boards extending at the lower portion of the body between the guards.

My improved luggage carrier comprises two longitudinal chain-members 9 and 10 provided at intervals with split rings 12 for the attachment of the cross chain as will hereinafter be more fully described. The chains 9 and 10 are attached at their ends to the mudguards of the vehicle by fastenings shown in detail in Figures 3, 4 and 5.

Each fastener comprises a clamp 13 which by means of a set-screw 14 is attached at the edge of the mudguard and which has an eye 15 for the attachment of the chains.

The clamps at one of the mudguards, preferably that at the front of the vehicle, have in connection with their eyes, eye-bolts 16 to which the chains are attached, and wing nuts 17 on the eye bolts, which by engagement with the eyes are instrumental in taking up the slack in the chains whereby to tighten the net of chains upon the luggage disposed on the running board.

A preferred method of fastening the chains to the eye bolts is by doubling them through the eyes and then fastening them upon themselves by hooks 9ª at their extremities as shown in Figure 3.

On the clamps attached to the opposite running board, the tightening bolts have been omitted and the chains are directly fastened to the eyes 15 by snaps 18 of the construction shown in detail in Figures 4 and 6. These snaps consist of a C-shaped loop 19 and a leaf-spring 20 fastened at one extremity of the loop by a clamping sleeve 21 and engaging the other end of the loop at the inner surface thereof.

The cross members of the net are formed of a single chain 22 drawn through the rings 12 of the upper and lower chains alternately and fastened at its ends to the same chains by open hooks 23 as best shown in Figure 3.

The net of chains is fastened to the running board of the vehicle by means of short chains 24 provided at their lower ends with snaps 25 similar in construction to that hereinbefore described.

The upper ends of the chains 24 are fastened to the rings 12 of the lower longitudinal chain 10, and the snaps 25 at their lower ends are fastened to lugs 26 attached at the lower surface of the running board as shown in detail in Figure 7.

The connections between the luggage carrier and the body of the vehicle are established by one or more short chains 27 having open hooks 28 at their ends as best shown in Figure 2. The lower ends of these chains may be attached to the rings on the upper longitudinal chain of the carrier or to any other part thereof, and their upper ends are looped around a standard of the windshield frame of the vehicle or hooked over the edge of the body or otherwise fastened in any convenient manner to any other part of the body or the superposed top-frame.

It will be understood from the above description that the luggage carrier is easily applied to or detached from the vehicle; that when not in use, it may be bunched to occupy a small storage space; and that it is readily adjusted to embrace bundles or other luggage bulging over the edge of the running board.

It will furthermore be evident that in order to carry articles of small dimensions or to protect a dog seated on the running board, the lower chain may be used separate from the longitudinal chain and the cross chain, or that to hold articles of large dimensions only, the upper chain may be used independent of the others.

Having thus described my invention, what I claim and desire to secure by Letters Patent is:

1. A luggage carrier for automobiles comprising two flexible longitudinal members and flexible cross members formed of a continuous chain connected in zig-zag manner between the longitudinal members, and means for fastening the carrier to an automobile in cooperative relation to the running board thereof.

2. A luggage carrier for automobiles comprising two flexible longitudinal members, rings on said members and flexible cross members formed of a continuous chain rove through the rings of the longitudinal members alternately, and means for fastening the carrier to an automobile in cooperative relation to the running board thereof.

3. A luggage carrier for automobiles comprising two flexible longitudinal members, rings on said members and flexible cross members formed of a continuous chain rove through the rings of the longitudinal members alternately and fastened at its ends to the longitudinal members, and means for fastening the carrier to an automobile in cooperative relation to the running board thereof.

4. A luggage carrier for automobiles comprising two flexible longitudinal members, rings on said members and flexible cross members formed of a continuous chain rove through the rings of the longitudinal members alternately, snaps on the longitudinal members for fastening said members to the running board and fenders of an automobile, and means for fastening the carrier to the automobile in cooperative relation to the running board thereof.

5. A luggage carrier for automobiles comprising upper and lower flexible longitudinal members, rings on said members and cross members formed of a continuous chain rove through the rings of the longitudinal members alternately, and means for fastening the carrier to an automobile, including members for connecting the rings of the lower longitudinal member to the running board thereof.

6. A luggage carrier for automobiles comprising upper and lower flexible longitudinal members, rings on said members and cross members formed of a continuous chain rove through the rings of the longitudinal members alternately, and means for fastening the carrier to an automobile, including members for connecting the rings of the upper longitudinal member to the body thereof.

7. A luggage carrier for automobiles comprising two longitudinal flexible members, means for fastening the ends thereof to the fenders of an automobile, rings on the members, flexible cross members formed of a continuous chain rove through said rings and fastened at its ends, and means for fastening the carrier to other parts of the vehicle by medium of the rings.

8. A luggage carrier for automobiles comprising upper and lower flexible longitudinal members, split loops of spring metal on said members, cross members formed of a continuous chain rove through said loops, alternating through the loops on the two members, and means connected with said loops for fastening the carrier to an automobile.

9. A luggage carrier for automobiles comprising two longitudinal members, cross members in sliding connection with the longitudinal members and extending in a zigzag manner between the same, and means for fastening the carrier to an automobile in cooperative relation to the running board thereof.

In testimony whereof I have affixed my signature.

JOHN W. BEMENT.